United States Patent
Howard et al.

(10) Patent No.: US 11,210,329 B2
(45) Date of Patent: Dec. 28, 2021

(54) METHODS AND SYSTEMS TO ESTIMATE RECALL WHILE SCREENING AN ORDERED LIST OF BIBLIOGRAPHIC REFERENCES

(71) Applicant: Sciome, LLC, Research Triangle Park, NC (US)

(72) Inventors: Brian Edward Howard, Raleigh, NC (US); Ruchir Shah, Durham, NC (US); Deepak Mav, Cary, NC (US); Kyle Miller, Durham, NC (US)

(73) Assignee: Sciome, LLC, Research Triangle Park, NC (US)

( * ) Notice: Subject to any disclaimer, the term of this patent is extended or adjusted under 35 U.S.C. 154(b) by 411 days.

(21) Appl. No.: 16/084,767

(22) PCT Filed: Mar. 14, 2017

(86) PCT No.: PCT/US2017/022301
§ 371 (c)(1),
(2) Date: Sep. 13, 2018

(87) PCT Pub. No.: WO2017/160837
PCT Pub. Date: Sep. 21, 2017

(65) Prior Publication Data
US 2019/0080002 A1 Mar. 14, 2019

Related U.S. Application Data

(60) Provisional application No. 62/308,087, filed on Mar. 14, 2016.

(51) Int. Cl.
*G06F 17/30* (2006.01)
*G06F 16/38* (2019.01)
(Continued)

(52) U.S. Cl.
CPC ............ *G06F 16/38* (2019.01); *G06F 16/901* (2019.01); *G06F 16/9038* (2019.01);
(Continued)

(58) Field of Classification Search
CPC ........ G06F 16/38; G06F 16/93; G06F 16/901; G06F 16/9038; G06N 20/00; G06N 7/005; G06Q 10/10
See application file for complete search history.

(56) References Cited

U.S. PATENT DOCUMENTS 8,620,842 B1  12/2013  Cormack
8,914,376 B2 * 12/2014  Ravid ................... G06F 16/951
                                                        707/740
(Continued)

OTHER PUBLICATIONS

O'Mara-Eves, Alison, et al., "Using text mining for study identification in systematic reviews: a systematic review of current approaches," Systematic Reviews, vol. 4, No. 5, BioMed Central, Jan. 14, 2015, URL: "https://systematicreviewsjournal.biomedcentral.com/articles/10.1186/2046-4053-4-5," retrieved Sep. 11, 2018, 22 pages.
(Continued)

*Primary Examiner* — Huawen A Peng
(74) *Attorney, Agent, or Firm* — Muncy, Geissler, Olds & Lowe, P.C.

(57) ABSTRACT

Methods and systems for estimating recall while screening an ordered list of bibliographic references are provided. According to one embodiment, a method includes: sorting a list of bibliographic references according to a sorting algorithm to produce a first list in order from most to least relevant; selecting, from the list, the most relevant reference, and displaying, to a human screener, information associated with the selected reference; and receiving the screener's judgment of the relevance of the selected reference. If sufficiently relevant, the selected reference is moved from the first list to a second list. The received indication is used
(Continued)

to re-sort the remaining references in the first list. A statistical model is used to estimate the number of relevant references remaining. That estimate is displayed to the screener. The process ends when the screener determines, based on the displayed estimate, that a sufficient number of relevant references has been found.

25 Claims, 8 Drawing Sheets

(51) Int. Cl.
| | | |
|---|---|---|
| *G06Q 10/10* | (2012.01) | |
| *G06F 16/93* | (2019.01) | |
| *G06F 16/901* | (2019.01) | |
| *G06F 16/9038* | (2019.01) | |
| *G06N 20/00* | (2019.01) | |
| *G06N 7/00* | (2006.01) | |

(52) U.S. Cl.
CPC ............ *G06F 16/93* (2019.01); *G06N 7/005* (2013.01); *G06N 20/00* (2019.01); *G06Q 10/10* (2013.01)

(56) References Cited

U.S. PATENT DOCUMENTS

| | | | | |
|---|---|---|---|---|
| 9,002,842 | B2* | 4/2015 | Ravid | G06F 16/285 |
| | | | | 707/736 |
| 9,836,545 | B2* | 12/2017 | LuVogt | G06Q 30/02 |
| 9,965,557 | B2* | 5/2018 | Melman | G06F 16/9535 |
| 10,445,381 | B1* | 10/2019 | Gharmalkar | G06F 16/35 |
| 2009/0083200 | A1* | 3/2009 | Pollara | G06N 20/00 |
| | | | | 706/14 |
| 2015/0310005 | A1* | 10/2015 | Ryger | G06F 16/3334 |
| | | | | 707/706 |
| 2016/0275147 | A1* | 9/2016 | Morimoto | G06F 16/2457 |

OTHER PUBLICATIONS

International Search Report and Written Opinion for International Patent Application No. PCT/US2017/022301, dated May 17, 2017, 14 pages.
International Preliminary Report on Patentability for International Patent Application No. PCT/US2017/022301, dated Sep. 27, 2018, 9 pages.

* cited by examiner

FIG. 5C

METHODS AND SYSTEMS TO ESTIMATE RECALL WHILE SCREENING AN ORDERED LIST OF BIBLIOGRAPHIC REFERENCES

RELATED APPLICATIONS

This application is a 35 U.S.C. § 371 national phase filing of International Application No. PCT/US2017/022301, filed Mar. 14, 2017, which claims the benefit of provisional patent application Ser. No. 62/308,087 filed Mar. 14, 2016, the disclosures of which are hereby incorporated herein by reference in their entireties.

FIELD OF THE DISCLOSURE

The present disclosure relates to bulk document analysis and particularly to computer-assisted real-time human screening of bibliographic references.

BACKGROUND OF THE INVENTION

A systematic review is a type of literature review and synthesis in which scientists attempt to answer a well-defined research question by considering and assimilating all available published evidence. It has been estimated that every year more than 4,000 systematic reviews are conducted and published, each with the goal of summarizing the current state of knowledge relevant to a specific research question. On average, the amount of time required to conduct a single systematic review is at least six months to a year and a considerable portion of this time is often spent on formulating the problem and identifying the relevant literature. For this reason, a large number of topics that would benefit from systematic review are waiting in queue and many systematic reviews are out of date by the time they are published.

One of the most time consuming steps in this process is simply searching for and screening the studies to be included in the review. Because systematic reviews are intended to be comprehensive, the standard approach is to perform an initial high-recall/low-precision literature search using various bibliographic databases. This may result in thousands or tens of thousands of citations that are potentially relevant. Then, guided by a detailed set of "Inclusion/Exclusion questions" human screeners must typically read the titles and abstracts from each and every reference to decide its potential relevance. This work is time consuming and error-prone.

Moreover, it is often the case that only a subset of the citations is relevant. Human screeners, however, face the dilemma that they do not know which of the citations are, in fact, relevant until they have reviewed all of the citations, which means that there is no alternative but to spend the potentially enormous amount of time going through the entire set. The goal is to identify 100% of the relevant documents as a result of the screening process.

As used herein, the term "recall" refers to the fraction of relevant documents that are identified by screening. As an example, for a list containing N number documents, of which T number of documents are relevant, a screening process that identifies all T number of documents as relevant achieves a 100% recall. A process that correctly identifies only S number of documents as relevant (where S<T) achieves a recall of (S/T) percent. It is desirable to develop methods and systems that achieve 100% recall without requiring a human screener to review each and every document in the set.

One approach to address this issue is to attempt to sort the citations in order by relevance and present the sorted list to the human screener(s), most relevant citations first. The idea is that at some point, the relevant documents have been found (i.e., recall approaches 100%) before the human screener has reviewed all of the documents in the set. However, this approach works only if the human screener can say with some certainty that none of the remaining documents are relevant. This problem is illustrated graphically in FIG. 1.

FIG. 1 is a graph illustrating the fraction of relevant documents that are identified by screening (percentage recall) as a function of the fraction of documents that are screened. FIG. 1 shows how quickly a screener can achieve 100% recall using different approaches. When the documents are presented to the screener in random order, the screener essentially must review 100% of the documents before achieving 100% recall.

When the documents are sorted according to relevance based on a keyword (e.g., based on how many times that keyword occurs within the document), the screener can more quickly reach 100% recall. FIG. 1 shows the results of five distinct keyword searches, each operating on a different dataset. In one dataset, where the documents were sorted using the keyword "neuropain", the screener was able to reach 100% recall after reviewing only 90% of the documents. In another dataset, where the documents were sorted using another keyword, "Fluoride", the screener was able to reach 100% recall after reviewing approximately 12% of the documents. FIG. 1 illustrates the point that sorting the documents according to some criteria for relevance before presenting them to the screener can reduce—sometimes dramatically—the time required for the screener to achieve 100% recall.

One problem that still remains, however, is that, as FIG. 1 shows, the screener does not know for sure when 100% coverage has been achieved until all of the documents have been reviewed. In the dataset where the documents were sorted using the keyword "PFOS/PFOA", for example, 97% recall was achieved after only 15% of the documents had been reviewed, but 100% recall was not achieved until 95% of the documents had been reviewed. Using conventional methods, after only 15% of the documents have been reviewed, the screener does not know whether 100% recall has been achieved, as was the case where the keyword was "fluoride", or whether 98% recall has been achieved, as was the case where the keyword was "PFOS/PFOA", or whether 86% recall has been achieved, as was the case where the keyword was "BPA", and so on. In other words, the screener has no idea when he or she can stop screening.

Although in theory if an algorithm that perfectly sorts documents according to relevance is used, the human screener could stop as soon as the first irrelevant document is found, in practice it is difficult to know whether the algorithm being used perfectly sorts the documents or not. This is one reason why human screeners are still needed, and why the human screeners have no clear idea when he or she has reviewed all of the relevant citations and is now (needlessly) reviewing citations that are not relevant.

Thus, there is a need for methods and systems that assist human screeners by providing some indication of when they can stop screening further documents. Put another way, there is a need for methods and systems for providing a human screener an estimated recall while screening an ordered list of bibliographic references.

SUMMARY OF THE INVENTION

The subject matter of the present disclosure includes methods and systems for providing a human screener an estimated recall while screening an ordered list of bibliographic references. Sciome, LLC provides such a web-based software tool, called Active-Screener. Active-Screener incorporates state-of-the art machine learning algorithms which use the content of the titles and abstracts and user input so far to build a statistical model which can then predict the inclusion/exclusion status of remaining, unread articles. It has been demonstrated that this approach can save 50% or more of the total screening effort while still obtaining 95% or more recall over relevant documents.

However, unlike competing approaches, the methods and systems presented herein are unique in that the screening history observed so far is used to place a statistically derived bound on the recall obtained so far.

According to one aspect of the present disclosure, a method for estimating recall while screening an ordered list of bibliographic references comprises the following steps: [A] sorting a list of bibliographic references according to a sorting algorithm to produce a first list of bibliographic references in order from most relevant to least relevant; [B] selecting, from the list, the most relevant reference, and displaying, to a human screener, information associated with the selected reference; [C] receiving, from the human screener, an indication of the human screener's judgment of the relevance of the selected reference; [D] upon a determination that the selected reference's relevance exceeds a threshold, including the selected reference in a second list of relevant references; [E] removing the selected reference from the set of unscreened references in the first list; [F] using the received indication to re-sort the remaining references in the first list according to relevance; [G] using a statistical model to estimate the number of relevant references remaining in the first list and displaying that estimate to the human screener, and continuing from step [B]; wherein the process continues looping through steps [B] through [G] until the human screener determines, based on the displayed estimate, that a sufficient number of relevant references has been found.

In one embodiment, displaying, to a human screener, information associated with the selected reference comprises displaying a title of the reference, an abstract of the reference, a figure of the reference, and/or some or all of the text of the reference.

In one embodiment, receiving the indication of the relevance of the selected reference comprises receiving a binary indication, a numerical score indication, and/or a textual score indication of the relevance.

In one embodiment, the re-sort step [F] is performed after every judgement by the human screener.

In one embodiment, the re-sort step [F] is performed periodically after a threshold number of judgements by the human screener.

In one embodiment, the re-sort step [F] is performed upon detection of a threshold condition.

In one embodiment, the re-sort step [F] is not performed upon detection of a threshold condition.

According to another aspect of the present disclosure, a system for estimating recall while screening an ordered list of bibliographic references comprises: a data store for maintaining information about the list of bibliographic references; one or more processors; and memory storing instructions executable by the one or more processors, whereby the system is operable to: receive from the data store a list of bibliographic references; sort the list of bibliographic references according to a sorting algorithm to produce a first list of bibliographic references in order from most relevant to least relevant; select, from the list, the most relevant reference, and display, to a human screener, information associated with the selected reference; receive, from the human screener, an indication of the human screener's judgment of the relevance of the selected reference; determine whether the selected reference's relevance exceeds a threshold, and, upon such determination, including the selected reference in a second list of relevant references; remove the selected reference from the first list; use the received indication to re-sort the remaining references in the first list according to relevance; use a statistical model to estimate the number of relevant references remaining in the first list and displaying that estimate to the human screener; and terminate the judgement process upon receiving, from the human screener, and indication that a sufficient number of relevant references has been found.

In one embodiment, the system further comprises a graphic user interface for at least one of: selecting, from the list, the most relevant reference, and displaying, to the human screener, the information associated with the selected reference; and receiving, from the human screener, the indication of the human screener's judgment of the relevance of the selected reference.

In one embodiment, selecting, from the list, the most relevant reference, and displaying, to a human screener, information associated with the selected reference comprises displaying a title of the reference, an abstract of the reference, a figure of the reference, and/or some or all of the text of the reference.

In one embodiment, receiving the indication of the relevance of the selected reference comprises receiving a binary indication, a numerical score indication, and/or a textual score indication of the relevance.

In one embodiment, the system is further operable to use the received indication to re-sort the remaining references in the first list according to relevance.

In one embodiment, the system performs the re-sort step after every judgement by the human screener.

In one embodiment, the system performs the re-sort step periodically after a threshold number of judgements have been made by the human screener.

In one embodiment, the system performs the re-sort step upon determination of a threshold condition.

In one embodiment, upon determination of a threshold condition, the system does not perform the re-sort step.

According to yet another aspect of the present disclosure, a system for estimating recall while screening an ordered list of bibliographic references is adapted to: [A] sort a list of bibliographic references according to a sorting algorithm to produce a first list of bibliographic references in order from most relevant to least relevant; [B] select, from the list, the most relevant reference, and display, to a human screener, information associated with the selected reference; [C] receive, from the human screener, an indication of the human screener's judgment of the relevance of the selected reference; [D] upon a determination that the selected reference's relevance exceeds a threshold, include the selected reference in a second list of relevant references; [E] remove the selected reference from the first list; [F] use the received indication to re-sort the remaining references in the first list according to relevance; and [G] use a statistical model to estimate the number of relevant references remaining in the first list and displaying that estimate to the human screener, wherein the system continues looping through steps [B] through [G] until the human screener determines, based on the displayed estimate, that a sufficient number of relevant references has been found.

According to yet another aspect of the present disclosure, a system for estimating recall while screening an ordered list of bibliographic references comprises: means for sorting a list of bibliographic references according to a sorting algorithm to produce a first list of bibliographic references in order from most relevant to least relevant; means for selecting, from the list, the most relevant reference, and displaying, to a human screener, information associated with the selected reference; means for receiving, from the human screener, an indication of the human screener's judgment of the relevance of the selected reference; means for, upon a determination that the selected reference's relevance exceeds a threshold, including the selected reference in a second list of relevant references; means for removing the selected reference from the first list; means for using the received indication to re-sort the remaining references in the first list according to relevance; means for using a statistical model to estimate the number of relevant references remaining in the first list and displaying that estimate to the human screener; and means for detecting that the human screener has determined, based on the displayed estimate, that a sufficient number of relevant references has been found.

According to yet another aspect of the present disclosure, a system for estimating recall while screening an ordered list of bibliographic references comprises: a sorting module for sorting a list of bibliographic references according to a sorting algorithm to produce a first list of bibliographic references in order from most relevant to least relevant; a selecting and displaying module for selecting, from the list, the most relevant reference, and displaying, to a human screener, information associated with the selected reference; a receiving module for receiving, from the human screener, an indication of the human screener's judgment of the relevance of the selected reference; a determining module for, upon a determination that the selected reference's relevance exceeds a threshold, including the selected reference in a second list of relevant references; a removing module for removing the selected reference from the first list; a decision module for using the received indication to re-sort the remaining references in the first list according to relevance; an estimation module for using a statistical model to estimate the number of relevant references remaining in the first list and displaying that estimate to the human screener; and a detection module for detecting that the human screener has determined, based on the displayed estimate, that a sufficient number of relevant references has been found.

According to yet another aspect of the present disclosure, a non-transitory computer readable medium storing software instructions that when executed by one or more processors of a system for estimating recall while screening an ordered list of bibliographic references causes the system to: [A] sort a list of bibliographic references according to a sorting algorithm to produce a first list of bibliographic references in order from most relevant to least relevant; [B] select, from the list, the most relevant reference, and display, to a human screener, information associated with the selected reference; [C] receive, from the human screener, an indication of the human screener's judgment of the relevance of the selected reference; [D] upon a determination that the selected reference's relevance exceeds a threshold, include the selected reference in a second list of relevant references; [E] remove the selected reference from the first list; [F] use the received indication to re-sort the remaining references in the first list according to relevance; and [G] use a statistical model to estimate the number of relevant references remaining in the first list and displaying that estimate to the human screener; and continue looping through steps [B] through [G] until the human screener determines, based on the displayed estimate, that a sufficient number of relevant references has been found.

According to yet another aspect of the present disclosure, a computer program comprises instructions which, when executed by at least one processor, cause the at least one processor to carry out any of the methods disclosed herein.

According to yet another aspect of the present disclosure, a carrier comprises the computer program described above, wherein the carrier is one of an electronic signal, an optical signal, a radio signal, or a computer readable storage medium.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 5C illustrates an exemplary review screen for a system for estimating recall while screening an ordered list of bibliographic references according to an embodiment of the present disclosure.

DETAILED DESCRIPTION

Figure 1:
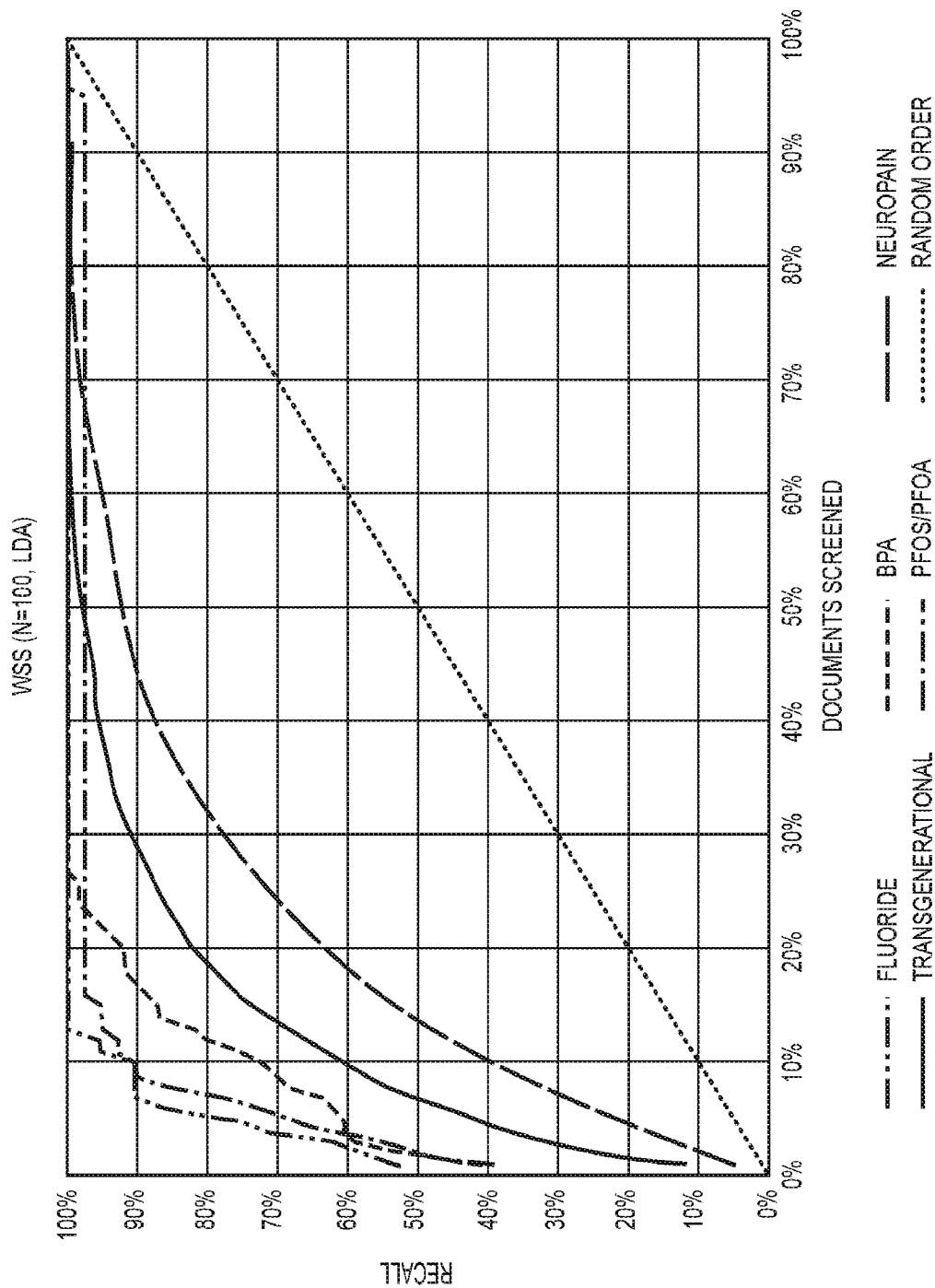
FIG. 1 is a graph illustrating the fraction of relevant documents that are identified by screening (percentage recall) as a function of the fraction of documents that are screened.
Figure 2:
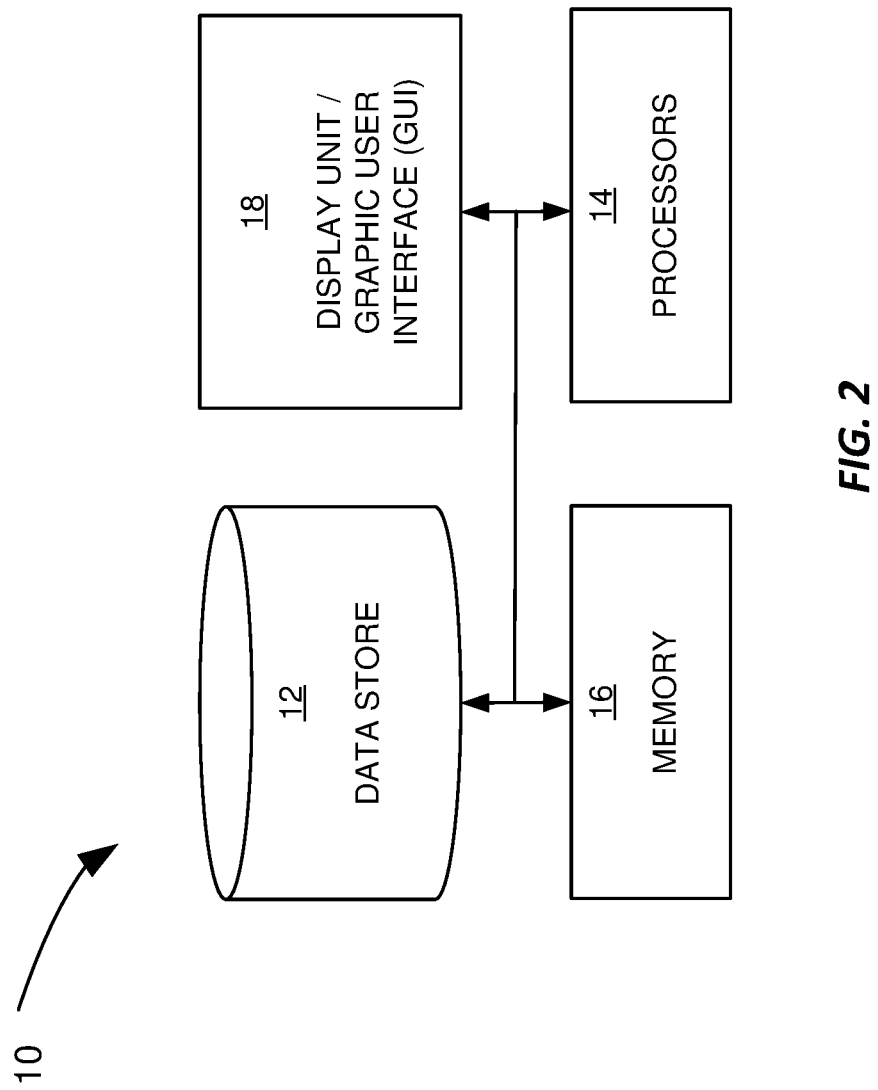
FIG. 2 is a block diagram of an exemplary system for estimating recall while screening an ordered list of bibliographic references according to an embodiment of the present disclosure.

FIG. 2 is a block diagram of an exemplary system for estimating recall while screening an ordered list of bibliographic references according to an embodiment of the present disclosure. In the embodiment illustrated in FIG. 2, the system 10 includes a data store 12 for maintaining information about the list of bibliographic references; one or more processors 14; and memory 16 storing instructions executable by the one or more processors, whereby the system 10 is operable to receive from the data store a list of bibliographic references, sort the list of bibliographic references according to a sorting algorithm to produce a first list of bibliographic references in order from most relevant to least relevant, and select, from the list, the most relevant reference and display, to a human screener, information associated with the selected reference, e.g., via a display unit/graphic user interface (GUI) 18. It will be understood that the display unit/GUI 18 may be a dedicated display unit such as a monitor, terminal, screen, etc., or may be GUI that is displayed on a personal computer, mobile phone or other mobile computing device, and so on. In one embodiment, the human screener interacts with the system 10 via a web browser. Thus, the display unit/GUI 18 may be alternatively referred to as "the display unit 18", "the GUI 18", or "the browser 18". The one or more processors 14 may be alternatively referred to as "the processor 14" or "the processors 14". The human screener may be alternatively referred to as "the screener", "the user of the system 10", or "the user".

The system 10 then selects, from the list, the most relevant reference and receives, from the human screener, an indication of the human screener's judgment of the relevance of the selected reference, determines whether the selected reference's relevance exceeds a threshold, and, upon such determination, includes the selected reference in a second list of relevant references. The system 10 then removes the selected reference from the first list and uses the received indication to re-sort the remaining references in the first list according to relevance. In one embodiment, the system 10 uses a statistical model to estimate the number of relevant references remaining in the first list and displays that estimate to the human screener. When the system 10 receives, from the human screener, an indication that a sufficient number of relevant references has been found, the judgement process is terminated.

In one embodiment, the components of the system 10, i.e., the data store 12, processors 14, memory 16, and GUI 18 may be co-located with each other, e.g., where they are components of a personal computer or mobile computing device. Alternatively, one or more of the components of the system 10 may be geographically remote from each other, such as when the system 10, or portions of the system 10, is a service or application hosted remotely, e.g., "cloud-based". The one or more processors 14 may be similarly distributed between a user-controlled device and a remote service. The one or more processors 14 may be any type of processing device, including a microcomputer or microcontroller, an application-specific integrated circuit (ASIC), field-programmable gate array (FPGA), logic circuit, etc.

Figure 3:
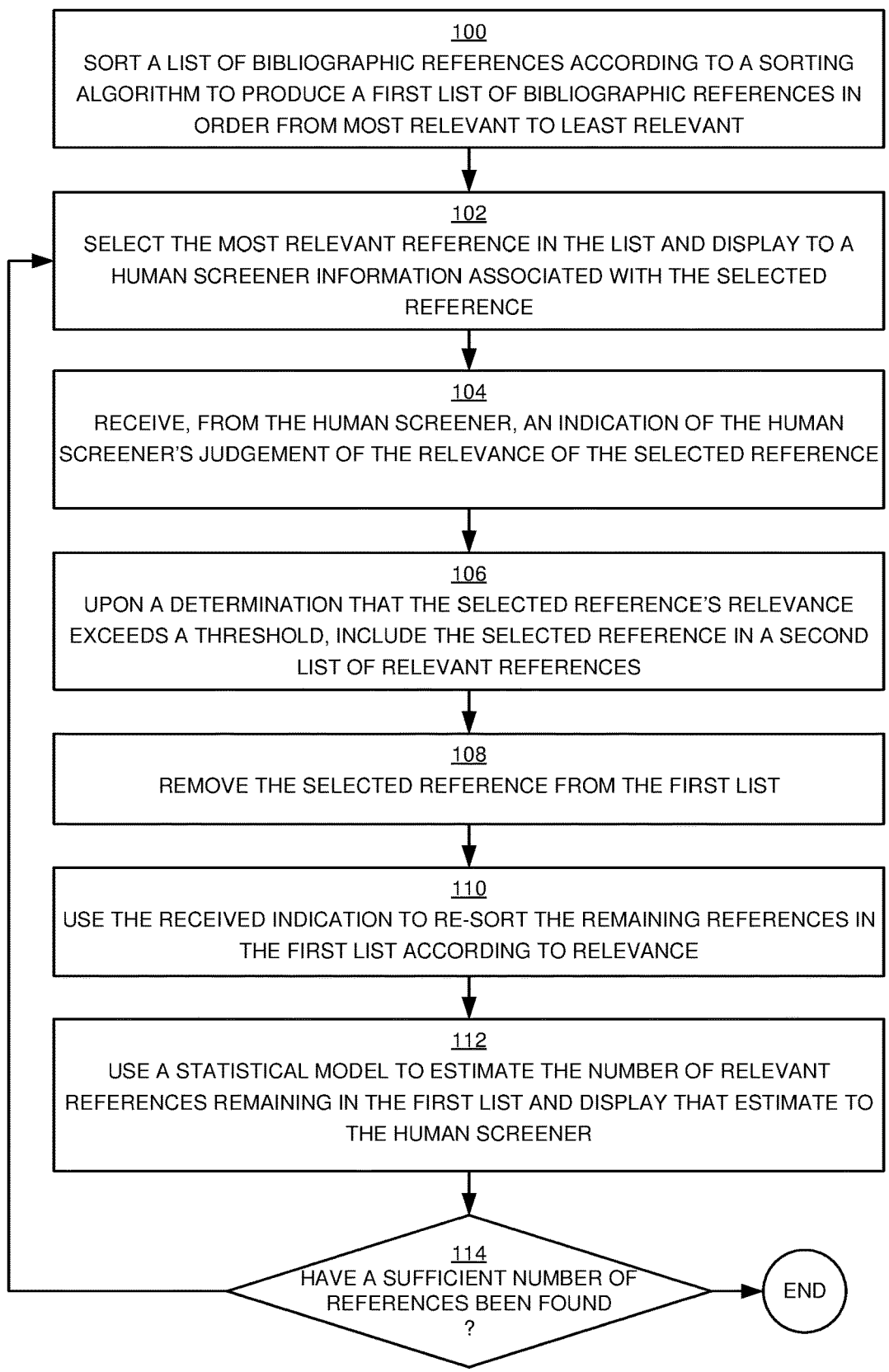
FIG. 3 is a flow chart illustrating an exemplary method for estimating recall while screening an ordered list of bibliographic references according to an embodiment of the present disclosure.

FIG. 3 is a flow chart illustrating an exemplary method for estimating recall while screening an ordered list of bibliographic references according to an embodiment of the present disclosure. In the embodiment illustrated in FIG. 3, the process includes the following steps, some of which may be described in reference to the exemplary system block diagram illustrated in FIG. 2.

At step 100, a list of bibliographic references is sorted according to a sorting algorithm to produce a first list of bibliographic references in order from most relevant to least relevant. Examples of sorting algorithms will be described in more detail below. In one embodiment, the processor 14 executes a program stored in the memory 16 to retrieve the bibliographic references from the data store 12, sort them, and store the sorted list in the memory 16, in the data store 12, or both.

At step 102, the most relevant reference is selected from the list and information associated with the selected reference is displayed, to a human screener, e.g., via the GUI 18. The information associated with the selected references in the list may include, but is not limited to, the entire document (or selected pages) or selected portions of the document, such as the document's title, author, and abstract. In one embodiment, the user may select which portions of the document will be displayed and/or how those selected portions are displayed (e.g., screen layout, font size, color scheme, etc.) In one embodiment, the system 10 may determine that certain portions of the selected reference have particular pertinence and highlight those portions to bring them to the attention of the user. Examples of highlighting include, but are not limited, to changing the font size, type, attribute, or color, changing a background color, surrounding the portions with a box, attaching a callout, etc. For example, if a user has supplied the system 10 with particular keywords or phrases that were used to create the original collection of documents or that are to be used during the screening process, in one embodiment the system 10 may highlight any keywords of phrases that appear in the document being displayed.

At step 104, the system 10 receives, from the human screener, an indication of the human screener's judgement of the relevance of the selected references. In one embodiment, the user may provide a binary "relevant" or "not relevant" decision. Alternatively, the user may provide a rank or relative scale of relevance, e.g., a number between 1 (not relevant) and 5 (very relevant), or similar. In one embodiment, the user may skip the document or ignore it for now, in which case the document will not be processed but instead return to the list of references.

At step 106, upon a determination that the selected reference's relevance value exceeds a threshold, the selected reference is included in a second list that is used for storing relevant references.

At step 108, the selected reference is removed from the first list. In one embodiment, the system 10 may update a progress bar, graph, or other visual indicator of progress displayed to the user.

At step 110, the received indication(s) of relevance are used to re-sort the remaining references in the first list according to relevance. In one embodiment, the system 10 may use the second list to continually retrain its sorting algorithm. That is, the system 10 will try to use the references that the user has indicated as relevant to predict what other references the user will find relevant. For example, the documents in the second list may be analyzed for frequently-appearing keywords. Other machine-learning and expert-system techniques may also be applied. Likewise, in one embodiment, the documents indicated as being not relevant may be analyzed for indicia of non-relevance, which also may be used to inform or train the sorting and prediction algorithms.

At step 112, a statistical model is used to estimate the number of relevant references remaining in the first list; that estimated number is displayed to the human screener. Examples of statistical models will be discussed in more detail below.

At step 114, if the human screener has indicated to the system 10 that a sufficient number of references have been found, the process ends. Otherwise, the process continues starting from step 102, where the selected reference in the list of remaining documents is presented to the human screener for judgement of relevance.

Figure 4:
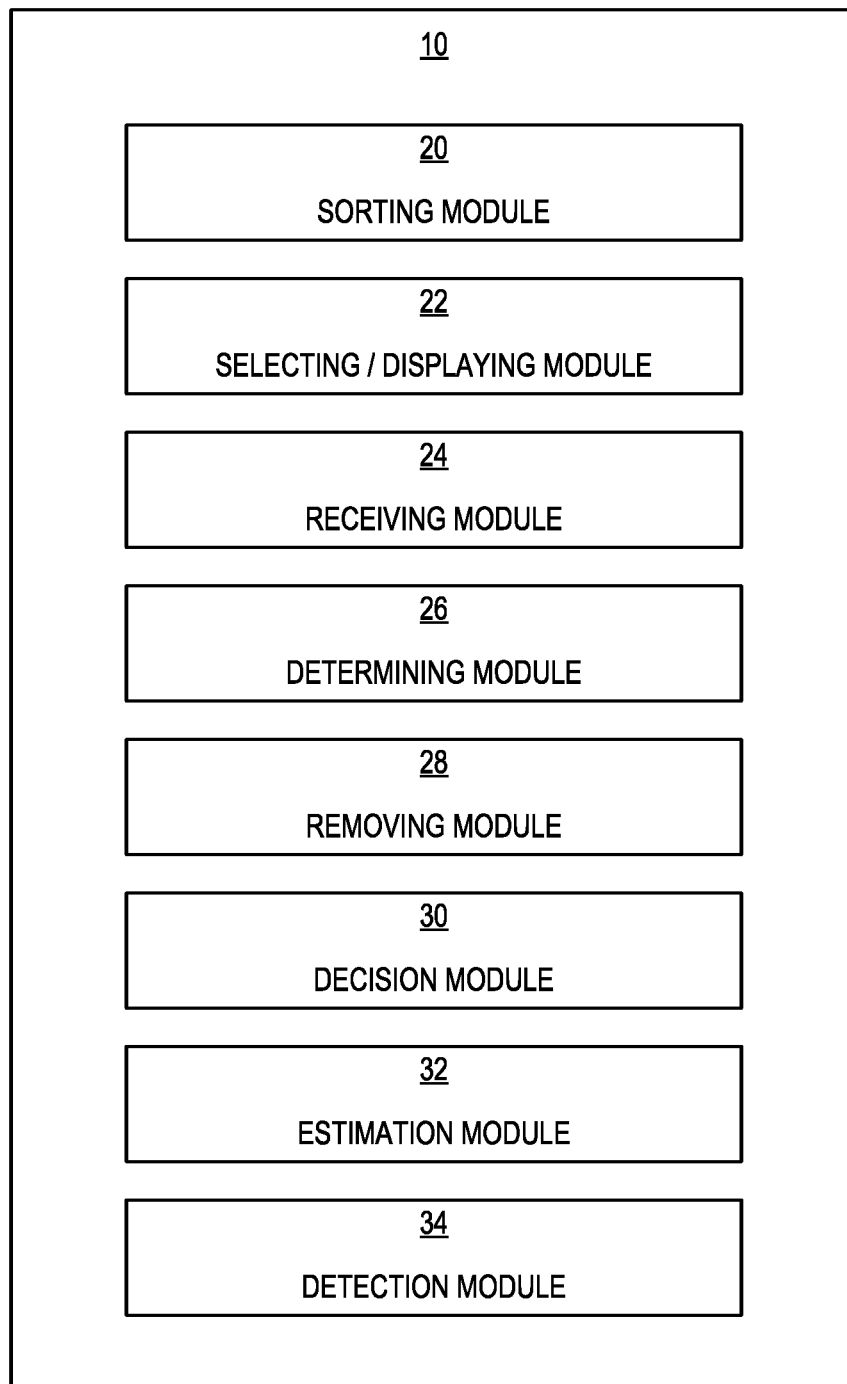
FIG. 4 is a block diagram of an exemplary system of estimating recall while screening an ordered list of bibliographic references according to another embodiment of the present disclosure.

FIG. 4 is a block diagram of an exemplary system of estimating recall while screening an ordered list of bibliographic references according to another embodiment of the present disclosure. In the embodiment illustrated in FIG. 4, system 10 includes: a sorting module 20 for sorting a list of bibliographic references according to a sorting algorithm to produce a first list of bibliographic references in order from most relevant to least relevant; a selecting/displaying module 22 for selecting, from the list, the most relevant reference and displaying, to a human screener, information associated with the selected reference; a receiving module 24 for receiving, from the human screener, an indication of the human screener's judgment of the relevance of the selected reference; a determining module 26 for, upon a determination that the selected reference's relevance exceeds a threshold, including the selected reference in a second list of relevant references; a removing module 28 for removing the selected reference from the first list; a decision module 30 for using the received indication to re-sort the remaining references in the first list according to relevance; an estimation module 32 for using a statistical model to estimate the number of relevant references remaining in the first list and displaying that estimate to the human screener; and a detection module 34 for detecting that the human screener has determined, based on the displayed estimate, that a sufficient number of relevant references has been found.

In one embodiment, one or more of the modules may be implemented in software, in hardware, or using a combination of software and hardware. The modules provide the functionality of estimating recall while screening an ordered list of bibliographic references described herein.

In some embodiments, a computer program including instructions which, when executed by at least one processor, causes the at least one processor to carry out the functionality of estimating recall while screening an ordered list of bibliographic references according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIGS. 5A through 5D are screen shots showing how the system for estimating recall, while screening an ordered list of bibliographic references, may appear to the human screener according to an example embodiment. In the embodiment illustrated in FIGS. 5A through 5D, the human screener is interacting with the system 10 via a web browser GUI 18, but the subject matter described herein is not limited to this embodiment.

Figure 5A:
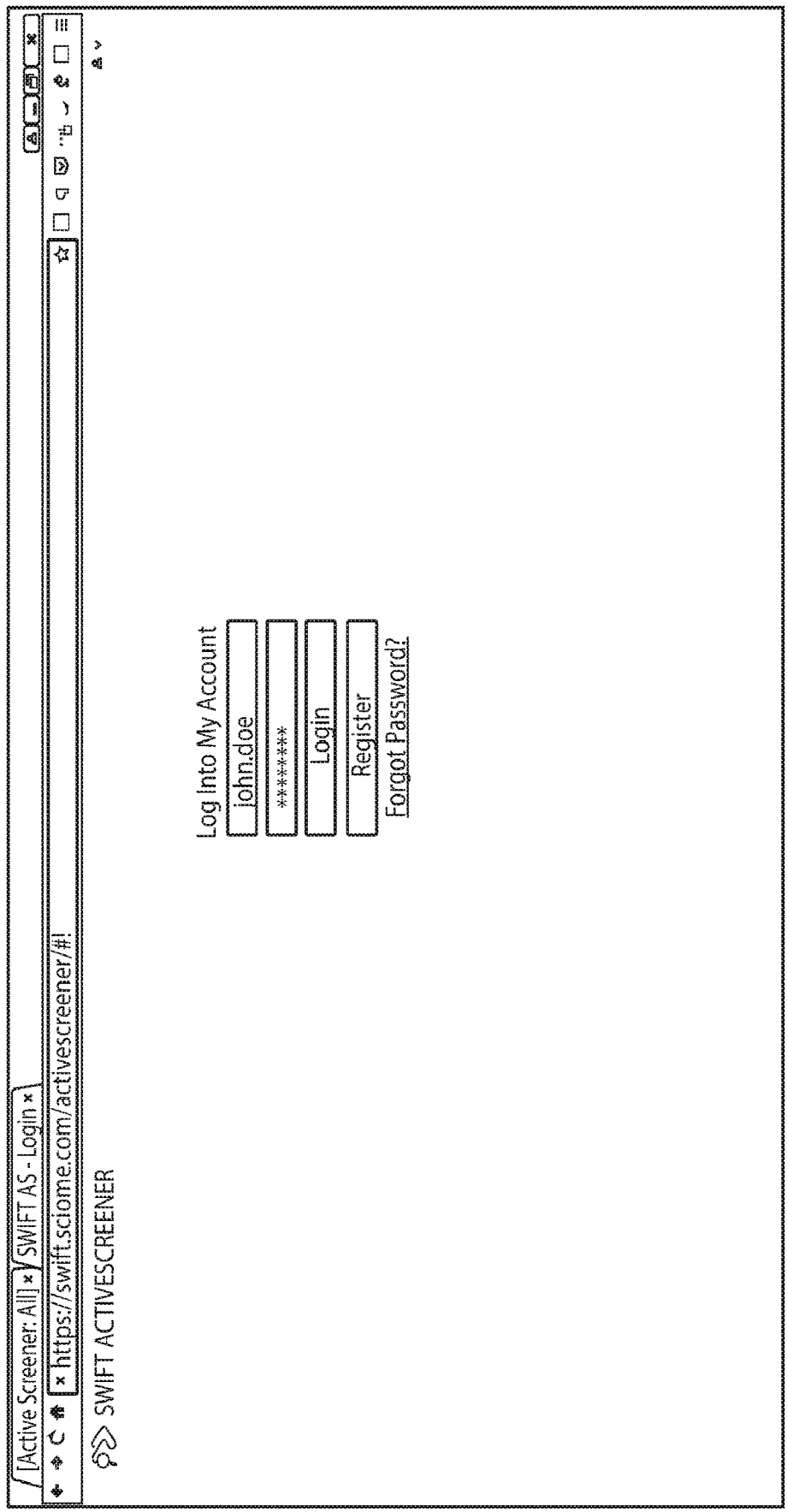
FIG. 5A illustrates an exemplary web-based graphic user interface (GUI) for a system for estimating recall while screening an ordered list of bibliographic references according to an embodiment of the present disclosure.

FIG. 5A shows a login page 36, via which the user logs into the system. In the embodiment illustrated in FIG. 5A, the user may log into an existing account by providing a password or may register for a new account.

Figure 5B:
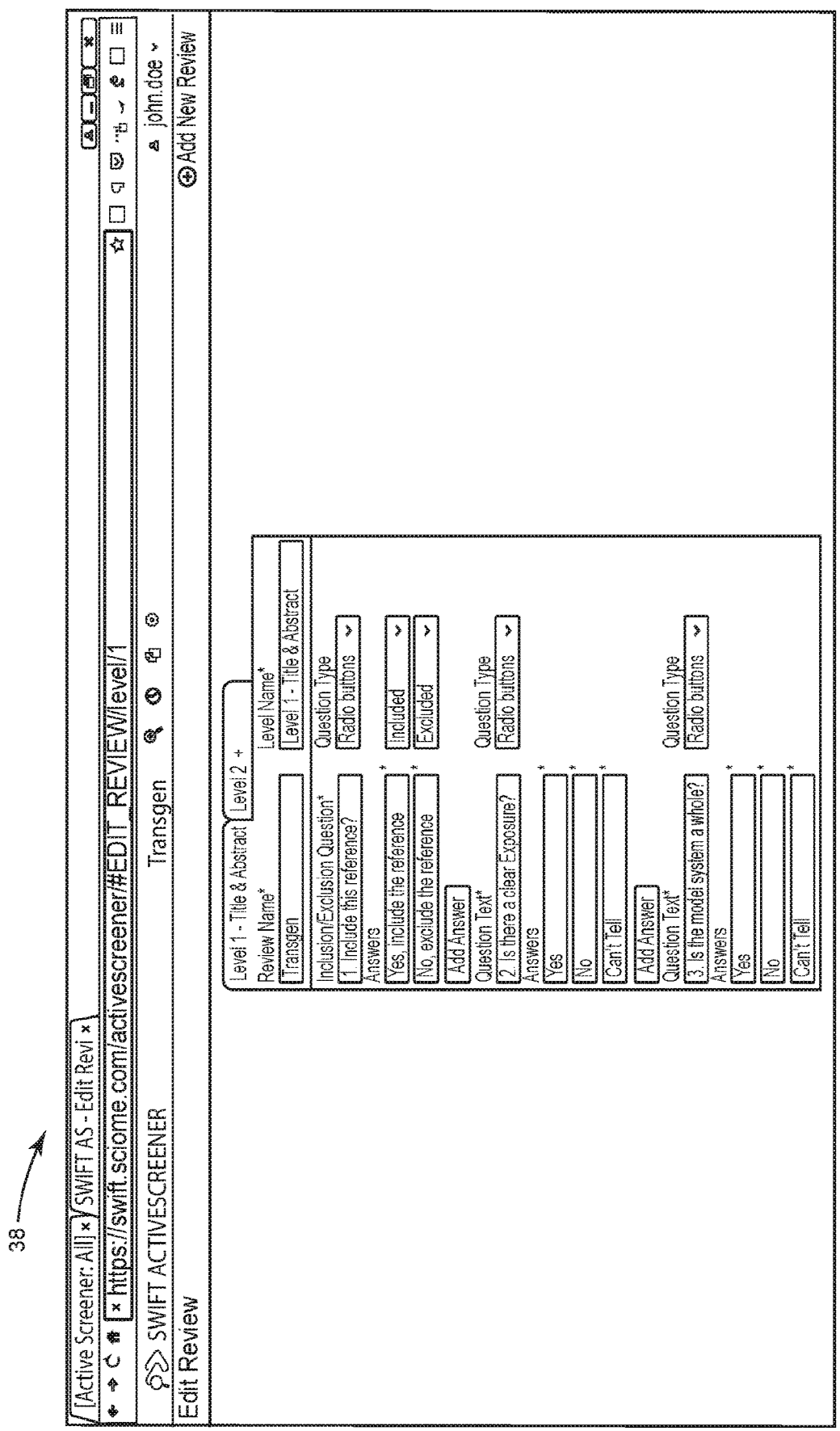
FIG. 5B illustrates an exemplary configuration dialog for a system for estimating recall while screening an ordered list of bibliographic references according to an embodiment of the present disclosure.

FIG. 5B illustrates an exemplary configuration dialog 38 where the user enters or selects parameters that control what kind of information is displayed during the screening process, what kind of response the user may provide, etc. Users create systematic review projects by specifying review questions, inviting users, and uploading references. In the embodiment illustrated in FIG. 5B, for example, the configuration options include, but are not limited to:

Review name: a name to identify the screening process and the list(s) of bibliographic references associated with the project.

Level name: a field that describes the level of detail of information related to the references to be displayed. In the embodiment shown in FIG. 5B, the user has selected "Title & Abstract" only, but other options include, but are not limited to "title only", "title, abstract, and front page", and "show all".

Inclusion/exclusion question: the prompt presented to the user along with the reference. In the embodiment shown in FIG. 5B, the prompt is "Include this reference?"

Question type: an indication of whether the question will have predefined answers (i.e., selectable by radio buttons), will allow the user to type in a response (i.e., into a text field), or other type. In the embodiment illustrated in FIG. 5B, the question type is "radio button", which constrains the available answers to be predefined and forces the user to select only one answer. Other options may include "checkbox", where the user may select more than one answer.

Answers: a list of allowable responses from the human screener. In the embodiment shown in FIG. 5B, the allowable answers include "Yes, include the reference" and "No, exclude the reference".

In the embodiment illustrated in FIG. 5B, the configuration dialog allows additional questions to be asked, such as "Is there a clear exposure?" or "Is the model system a whole-animal system {vertebrate or invertebrate}?" Such additional questions may be put there to help the human screener to make a determination of relevance and/or to collect additional data to be used to further filter, sort, or categorize the documents identified as relevant, the documents identified as not relevant, or both. Once the review is set-up, screeners read the title, abstract and/or full text pdf for each reference. They are guided to answer questions about the material and to make a decision about whether or not to include the reference in the study. The computer uses a statistical method called active learning to decide what order the references should be shown to maximize the chance of presenting relevant items early in the screening process.

In one embodiment, one or more screeners may operate on the same list of documents simultaneously. Each time a screener makes a relevancy decision the system will update the lists of relevant documents for all screeners. In one embodiment, each screener gets the most relevant document at that instant; that document is considered pending and is treated as if it was removed from the pending list (or actually is removed), with the result that the next screener to request a new document to screen will get a different document, e.g., no two screeners will consider the same document. Alternatively, the system 10 may be configured so that multiple screeners can provide a screening decision for the same document, in which case the system 10 may take both decisions into account, e.g., by score averaging, etc.

Figure 5C:
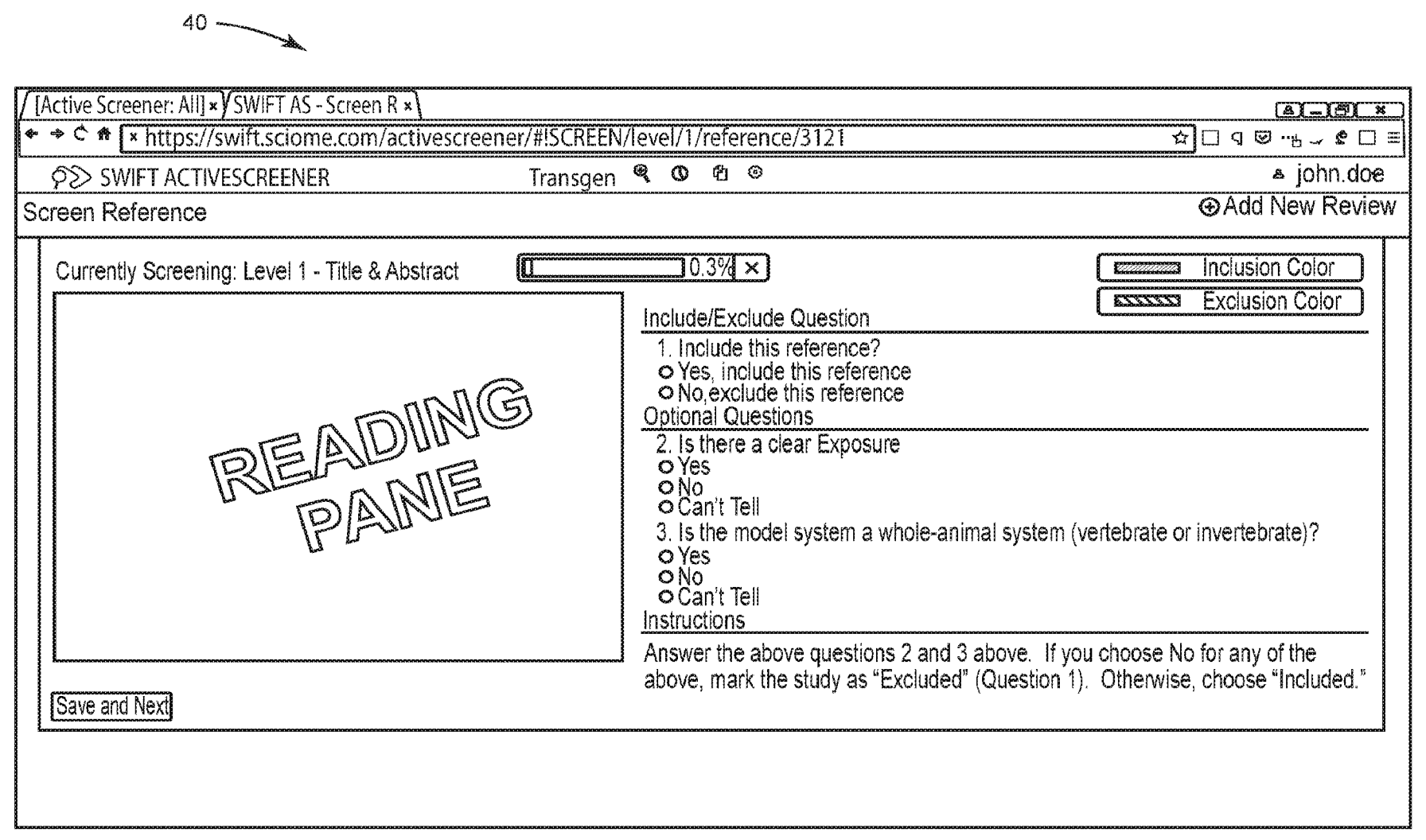

FIG. 5C illustrates an exemplary review screen 40 for a system for estimating recall while screening an ordered list of bibliographic references according to an embodiment of the present disclosure. In the embodiment illustrated in FIG. 5C, portions of the currently most relevant document are displayed on the left side of the review screen 40. The right side of the review screen 40 displays the prompt questions and the user instructions, and also contains the user input portion, which in this example are radio buttons which the user can click to indicate the relevancy determination. In the embodiment illustrated in FIG. 5C, once the user has made the determination of relevance of the document currently being displayed, the user clicks the "Save and Next" button to record that decision and prompt the system 10 to remove the currently displayed document from the list and present the most relevant document remaining in the list. In the embodiment illustrated in FIG. 5C, a progress bar is displayed in the top portion of the review screen 40.

Figure 5D:
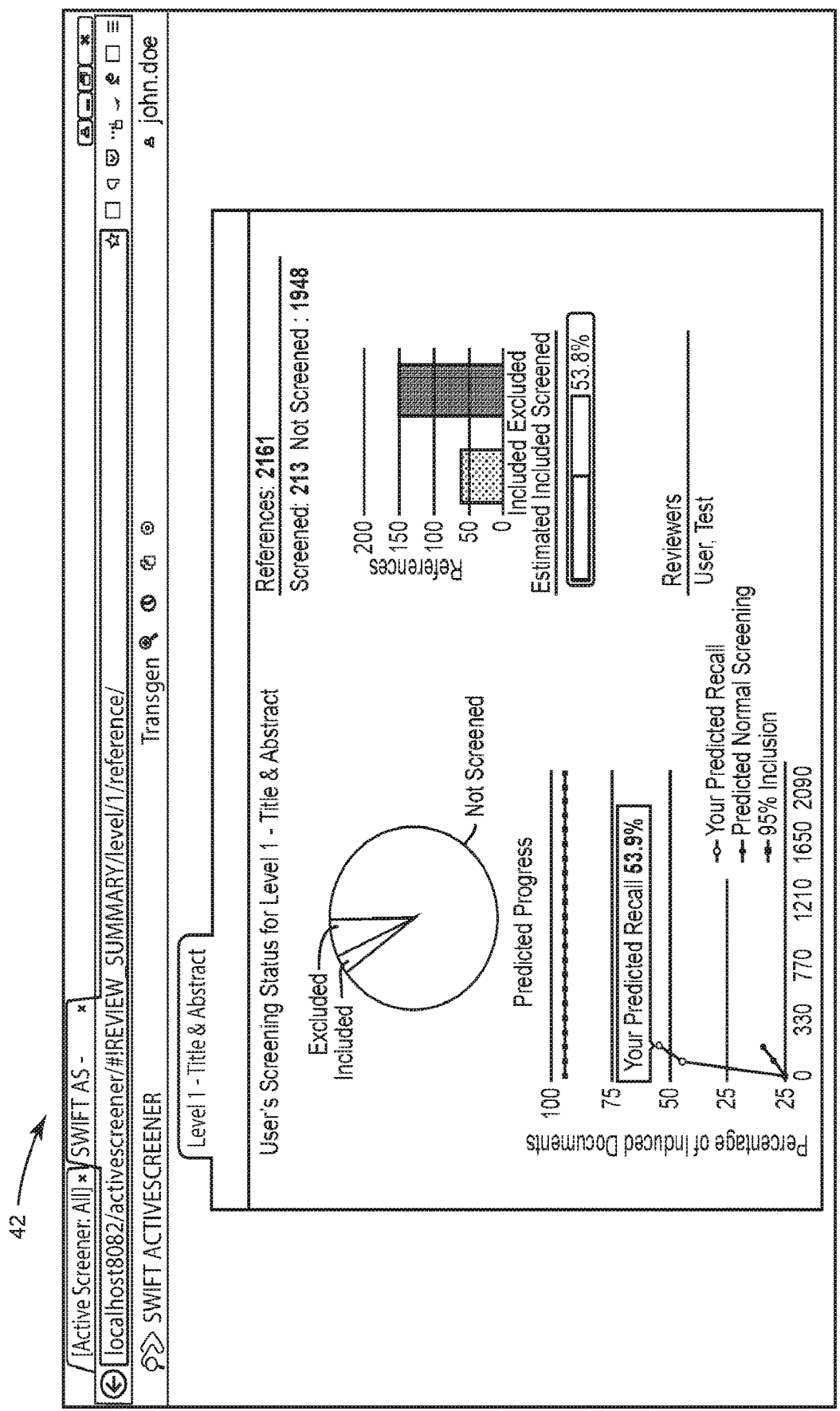
FIG. 5D illustrates an exemplary progress/status screen for a system for estimating recall while screening an ordered list of bibliographic references according to an embodiment of the present disclosure.

FIG. 5D illustrates an exemplary progress/status screen 42 for a system for estimating recall while screening an ordered list of bibliographic references according to an embodiment of the present disclosure. In the embodiment illustrated in FIG. 5D, the progress/status screen 42 displays information about the progress of the screening session. Such information may include, but is not limited to:

Screening status: an indication of actual progress through the list. In the embodiment shown in FIG. 5D, a pie chart shows documents not screened, documents screened and included, and documents screened and excluded. Also shown are the total number (e.g., 2161), the number screened (e.g., 213), the number not screened (e.g., 1948), and a bar chart comparing the number included versus the number excluded.

Predicted progress: an estimate of how close the screener is to reviewing all pertinent documents in the list. In the embodiment illustrated in FIG. 5D, a line graph compares the progress as measured by normal screening (i.e., where all documents are reviewed by the human screener) versus predicted recall, which is the estimate of many of the relevant documents have been screened by the user, based on the system's current sorting and relevancy algorithms.

This value of predicted recall, shown as a percentage (e.g., 53.8%) is shown as a simple progress bar labeled "Estimated Included Screened" on the right side of the figure. Prior art systems do not calculate or provide this number, and thus do not provide the screener with any indication that they have reviewed all of the pertinent documents or not, which causes the screener to be uncertain whether or not additional screening is necessary, which results in the human screener needlessly spending time reviewing documents that are not relevant. In the example shown in FIG. 5D, predicted normal screening reports that the screening task is approximately 9.8% complete, based on the ratio:

$$\frac{\text{number of documents screened}}{\text{total number of documents}}$$

which in this example is $$\frac{213}{2161} = 0.0986.$$

In contrast, the system 10 estimates that the screening task is 53.8% complete, based on the ratio:

$$\frac{\text{number of documents screened}}{\text{estimated number of relevant documents remaining}}.$$

In this manner, the system 10 may use a statistical model to automatically estimate the number of remaining included references, based on what has been seen so far. The system 10 can help users decide when to stop screening based on the estimated recall obtained. Our research has shown that this approach can substantially reduce the number of documents that must be screened while still maintaining high recall.

"When to Stop"/Recall Estimation Problem

As discussed above, research has shown that machine learning and active learning can be used to prioritize documents such that the most relevant documents are most likely to occur at the beginning of the list.

For example, it might be possible to rank the documents such that 95% of the relevant documents occur within the top 25% of the ranked list. This could (ideally) result in a 70% reduction in the number of screened articles. That is, for a randomly ordered list of articles, you would have to screen, on average, 95% of the articles to achieve 95% recall. Since this same recall can be achieved by reading only the top 25% of the prioritized list, the "Work Saved over random Sampling at 95% recall" (WSS@95) is 95%–25%=70%.

The problem is that all of this assumes that one knows when to stop screening. That is, unless one knows the true number of included articles in the entire list of candidates, it is impossible to calculate the exact level of recall achieved after screening the top 25% of the list. Thus, to solve the "When to Stop" problem the following should be considered:

A method to determine a threshold at which screening can stop, referred to herein as the "stop threshold".

A method to accurately estimate the recall at each position in the ranked list. This estimate could guide the decision of choosing the stop threshold.

A method to assess the variability of this estimate or to put some kind of confidence bound around the recall estimate.

In other words, it would be desirable to notify the screeners that, for example, after scanning the top 25% of the ranked list, the expected recall is X % and a 95% confidence interval for this estimate is [Y % to Z %].

Methods Used to Estimate Recall

In one embodiment, a combination of one or more of the following approaches is used to estimate recall:

Method #1 for Estimating Recall

One method to estimate recall and decide when to stop uses the screening already performed as input to a simple statistical model. It can work independently of the method used to prioritize the screened documents and operates by examining the lengths of consecutive spans of 'irrelevant' documents that occur during screening. As the screener proceeds through the ranked list of citations, the gaps between relevant documents will tend to increase in length. The lengths of these gaps provide a basis for estimating the local probability of document relevance. For example, under the minimal assumption that, on average, relevant documents are more likely to appear at the top of the list, it is possible to model the sum of the n most recent gap lengths using a negative binomial distribution. This allows the system 10 to put a bound on the recall achieved so far during screening and to give screeners the ability to make a decision to stop screening with confidence that they have not missed a large number of important documents. The stopping algorithm works as follows:

Stopping Algorithm

There is one parameter to the algorithm: "lookback", an integer denoted by $\delta$. Starting at the current position in the ranked list, traverse backwards through the list of already-screened items. Compute the total gap distance, D, (in number of irrelevant documents) between the current document and the $\delta^{th}$ previous relevant document. If the inclusion rate for remaining documents is p, and supposing (hypothetically) that documents were sampled randomly for screening, then $D \sim \text{NegBin}(\delta; p)$ In one embodiment, D and δ are known, and thus p can be estimated for the remaining documents and/or a confidence interval for its estimate can be computed. Furthermore, given p, the number of documents remaining in the list, R, and the number of included documents detected so far, TP, it is likewise possible compute a (conservative) estimate for the recall at this position in the list:

$$\text{Estimated Recall} = \frac{TP}{TP + (R*P)}$$

In addition, a statistical method, such as an exact interval, transformation based asymptotic approximations, bootstrapping or a Bayesian confidence interval, for example, may be used to compute a confidence interval around the estimated recall.

It is also possible to adapt the recall estimate method by further integrating the procedure into the prioritization method. For example, during screening, it may be advantageous to switch to pure random sampling, or to mix with pure random sampling when presenting users with the prioritized list during active-learning.

Method #2 for Estimating Recall

A second method that may be used to estimate recall uses an Empirical/Hierarchical Bayesian Model to model probability of inclusion. This model utilizes both actual screening order, document "importance score" (the numerical output of a machine learning or active learning classifier) and the post screening inclusion status simultaneously by introducing an unobserved latent binary variable that denotes the model classifier based on random selection based nomination of documents.

It can be assumed that the observed inclusion statuses of screened documents can be modeled as having arisen from a mixture of underlying distributions. For example, the first stream of documents can be assumed to be included following a random process that is independent of the assigned importance scores; the second stream of documents has an inclusion probability that is dependent on importance scores or pre-defined feature scores of those documents.

As a concrete example, let:
$Y_i \in \{0,1\}$ denote the inclusion status of document i,
$Z_i \in \{0,1\}$ denote whether the $i^{th}$ document was nominated for screening by the classifier based or random selection process,
$x_i$ denote feature vectors of $i^{th}$ document, and
$g_i$ denote hyper features of $i^{th}$ document,
It is assumed that:

$$Pr[Y_i=y_i|Z_i=z_i]=\mu(z_i x_i)^{y_i}(1-\mu(z_i x_i))^{1-y_i}; i=1,2,\ldots,n$$

$$\mu(\Delta)=(1+e^{-(\beta+\phi'\Delta)})^{-1};$$

$$Pr[Z_i=z_i]=\psi(g_i)^{z_i}(1-\psi(g_i))^{1-z_i}; \text{ and}$$

$$\psi(g)=(1+e^{-\kappa'g})^{-1}.$$

Model 1 (M1) assumes that the prior probability of nomination by classifier remains constant throughout screening. i.e, $g_i=1 \forall i=1, 2, \ldots n$.

Model 2 (M2) assumes that the prior probability of nomination is high at the beginning of the ranked list but reduces as screening progresses by assuming $$g_i = \left[1, \frac{n-i+1}{n}\right].$$

The model parameters $\Omega=(\beta, \phi, \kappa)$ are estimated using maximum likelihood estimation (MLE).

The likelihood function for the above model can be computed using the following marginal distribution function of $Y_i$ derived as following $$Pr[Y_i=y_i]=\pi_i^{y_i}(1-\pi_i)^{1-y_i}$$

where $$\pi_i=\psi(g_i)\mu(x_i)+(1-\psi(g_i))\mu(0).$$

Once the model parameters are estimated, the probability of finding interesting document via the random selection process $\widehat{\mu(0)}$ and corresponding confidence interval is using invariant property of MLE.

Those skilled in the art will recognize improvements and modifications to the embodiments of the present disclosure. All such improvements and modifications are considered within the scope of the concepts disclosed herein and the claims that follow.

What is claimed is:

1. A method for estimating recall while screening an ordered list of bibliographic references, the method comprising the following steps:
   [A] sorting a list of bibliographic references according to a sorting algorithm to produce a first list of bibliographic references in order from most relevant to least relevant;
   [B] selecting, from the first list, the most relevant reference, and displaying information associated with the selected reference;
   [C] receiving an indication of judgment of a relevance of the selected reference;
   [D] including, upon a determination that the relevance of the selected reference exceeds a threshold, the selected reference in a second list of relevant references;
   [E] removing the selected reference from the first list;
   [F] re-sorting, using the received indication, any remaining references in the first list according to relevance;
   [G] estimating, using a statistical model, the number of relevant references remaining in the first list and displaying that estimate, and continuing from step [B]; and
   looping through steps [B] through [G] until receiving an indication that a sufficient number of relevant references has been found,
   wherein using the statistical model comprises using a mathematical relationship between an order in which documents are screened, a document importance score as generated by a machine learning or active learning classifier, a post-screening inclusion status, a content of titles and abstracts of the screened and unscreened documents, or combinations thereof, to probabilistically estimate the number of relevant references remaining in the first list, wherein the order in which documents are screened comprises position within the screened list of the relevant and irrelevant documents and the length of gaps between them, and wherein the document importance score comprises a predicted relevance according to a machine learning classification model or active learning classifier comprising a machine learning algorithm that predicts the relevance of unscreened documents based on their content; and wherein displaying the estimated number of relevant references remaining in the first list comprises displaying the estimated number of relevant documents remaining, a ratio of the number of documents screened to the estimated number of relevant documents remaining, or both.

2. The method of claim 1 wherein displaying the information associated with the selected reference comprises displaying a title of the reference, an abstract of the reference, a figure of the reference, some or all text of the reference, or combinations thereof.

3. The method of claim 1 wherein receiving the indication of the relevance of the selected reference comprises receiving a binary indication, a numerical score indication, a textual score indication of the relevance, or combinations thereof.

4. The method of claim 1 wherein the re-sorting step [F] is performed after each judgement.

5. The method of claim 1 wherein the re-sorting step [F] is performed periodically after a threshold number of judgements.

6. The method of claim 1 wherein the re-sorting step [F] is performed upon detection of a threshold condition.

7. The method of claim 1 wherein the re-sorting step [F] is not performed upon detection of a threshold condition.

8. The method of claim 1 wherein using the mathematical relationship between an order in which documents are screened, a document importance score as generated by a machine learning or active learning classifier, a post-screening inclusion status, or combinations thereof, comprises using a negative binomial distribution to model a sum of N most recent gaps between relevant documents.

9. The method of claim 1 wherein using the mathematical relationship between an order in which documents are screened, a document importance score as generated by a machine learning or active learning classifier, a post-screening inclusion status, or combinations thereof, comprises using a statistical method to compute a confidence interval around the estimated recall.

10. The method of claim 9 wherein using a statistical method to compute a confidence interval around the estimated recall comprises using an exact interval, a transformation based asymptotic approximation, bootstrapping, or a Bayesian confidence interval to compute the confidence interval around the estimated recall.

11. The method of claim 1 wherein using the mathematical relationship between an order in which documents are screened, a document importance score as generated by a machine learning or active learning classifier, a post-screening inclusion status, or combinations thereof, comprises using a hierarchical Bayesian model of the screening process.

12. A system for estimating recall while screening an ordered list of bibliographic references, the system comprising:
a data store for maintaining information about the list of bibliographic references;
one or more processors; and
memory storing instructions executable by the one or more processors, whereby the system is operable to:
receive from the data store a list of bibliographic references;
sort the list of bibliographic references according to a sorting algorithm to produce a first list of bibliographic references in order from most relevant to least relevant;
select, from the first list, the most relevant reference, and display information associated with the selected reference;
receive an indication of judgment of a relevance of the selected reference;
determine whether the relevance of the selected reference exceeds a threshold, and, upon such determination, including the selected reference in a second list of relevant references;
remove the selected reference from the first list;
re-sort, using the received indication, any remaining references in the first list according to relevance;
estimate, using a statistical model, the number of relevant references remaining in the first list and displaying that estimate; and
terminate the screening the list of bibliographic references upon receiving an indication that a sufficient number of relevant references has been found,
wherein using the statistical model comprises using a mathematical relationship between an order in which documents are screened, a document importance score as generated by a machine learning or active learning classifier, a post-screening inclusion status, a content of titles and abstracts of the screened and unscreened documents, or combinations thereof, to probabilistically estimate the number of relevant references remaining in the first list, wherein the order in which documents are screened comprises position within the screened list of the relevant and irrelevant documents and the length of gaps between them, and wherein the document importance score comprises a predicted relevance according to a machine learning classification model or active learning classifier comprising a machine learning algorithm that predicts the relevance of unscreened documents based on their content; and
wherein displaying the estimated number of relevant references remaining in the first list comprises displaying the estimated number of relevant documents remaining, a ratio of the number of documents screened to the estimated number of relevant documents remaining, or both.

13. The system of claim 12 further comprising a graphic user interface for at least one of: displaying the information associated with the selected reference; and receiving the indication of judgment of the relevance of the selected reference.

14. The system of claim 12 wherein displaying the information associated with the selected reference comprises displaying a title of the reference, an abstract of the reference, a figure of the reference, some or all text of the reference, or combinations thereof.

15. The system of claim 12 wherein receiving the indication of the relevance of the selected reference comprises receiving a binary indication, a numerical score indication, a textual score indication of the relevance.

16. The system of claim 12 wherein, via execution of the instructions by the one or more processors, the system is further operable to use the received indication to re-sort the remaining references in the first list according to relevance, or combinations thereof.

17. The system of claim 16 wherein the system performs the re-sorting step after each judgement.

18. The system of claim 16 wherein the system performs the re-sorting step periodically after a threshold number of judgements have been made.

19. The system of claim 16 wherein the system performs the re-sorting step upon determination of a threshold condition.

20. The system of claim 16 wherein, upon determination of a threshold condition, the system does not perform the re-sorting step.

21. The system of claim 12 wherein using the mathematical relationship between an order in which documents are screened, a document importance score as generated by a machine learning or active learning classifier, a post-screening inclusion status, or combinations thereof, comprises using a negative binomial distribution to model a sum of N most recent gaps between relevant documents.

22. The system of claim 12 wherein using the mathematical relationship between an order in which documents are screened, a document importance score as generated by a machine learning or active learning classifier, a post-screening inclusion status, or combinations thereof, comprises using a statistical method to compute a confidence interval around the estimated recall.

23. The system of claim 22 wherein using a statistical method to compute a confidence interval around the estimated recall comprises using an exact interval, a transformation based asymptotic approximation, bootstrapping, or a Bayesian confidence interval to compute the confidence interval around the estimated recall.

24. The system of claim 12 wherein using the mathematical relationship between an order in which documents are screened, a document importance score as generated by a machine learning or active learning classifier, a post-screening inclusion status, or combinations thereof, comprises using a hierarchical Bayesian model of the screening process.

25. A non-transitory computer readable medium storing software instructions that when executed by one or more processors of a system for estimating recall while screening an ordered list of bibliographic references cause the system to:

[A] sort a list of bibliographic references according to a sorting algorithm to produce a first list of bibliographic references in order from most relevant to least relevant;

[B] select, from the first list, the most relevant reference, and display information associated with the selected reference;

[C] receive an indication of judgment of the relevance of the selected reference;

[D] upon a determination that the relevance of the selected reference exceeds a threshold, include the selected reference in a second list of relevant references;

[E] remove the selected reference from the first list;

[F] re-sort, using the received indication, any remaining references in the first list according to relevance;

[G] estimate, using a statistical model, the number of relevant references remaining in the first list and displaying that estimate; and loop through steps [B] through [G] until receiving an indication that a sufficient number of relevant references has been found, wherein using the statistical model comprises using a mathematical relationship between an order in which documents are screened, a document importance score as generated by a machine learning or active learning classifier, a post-screening inclusion status, a content of titles and abstracts of the screened and unscreened documents, or combinations thereof, to probabilistically estimate the number of relevant references remaining in the first list, wherein the order in which documents are screened comprises position within the screened list of the relevant and irrelevant documents and the length of gaps between them, and wherein the document importance score comprises a predicted relevance according to a machine learning classification model or active learning classifier comprising a machine learning algorithm that predicts the relevance of unscreened documents based on their content; and wherein displaying the estimated number of relevant references remaining in the first list comprises displaying the estimated number of relevant documents remaining, a ratio of the number of documents screened to the estimated number of relevant documents remaining, or both.

* * * * *